United States Patent [19]
Kume et al.

[11] Patent Number: 5,109,535
[45] Date of Patent: Apr. 28, 1992

[54] APPARATUS FOR TRANSMISSION-RECEPTION SIMULATION TEST FOR MICROWAVE COMMUNICATION

[75] Inventors: Tomiyuki Kume; Haruhiko Gotou, both of Otawara, Japan

[73] Assignee: Fujitsu Limited, Kanagawa, Japan

[21] Appl. No.: 365,714

[22] Filed: Jun. 14, 1989

[30] Foreign Application Priority Data

Jun. 14, 1988 [JP] Japan .................. 63-146659

[51] Int. Cl.$^5$ ............................................ H04B 17/00
[52] U.S. Cl. .................... 455/67.4; 455/115; 455/226; 455/314; 455/67.5; 455/226.1
[58] Field of Search ............... 455/67, 86, 115, 226, 455/74, 76, 85, 58, 207–209, 314–316; 375/10; 370/13, 14, 17

[56] References Cited

U.S. PATENT DOCUMENTS

| | | | |
|---|---|---|---|
| 4,048,564 | 9/1977 | Gleeson, Jr. ...................... | 455/226 |
| 4,361,904 | 11/1982 | Matsumura .......................... | 455/115 |
| 4,443,661 | 4/1984 | Kubo ................................. | 179/2 EB |
| 4,580,274 | 4/1986 | Debany, Jr. et al. ................ | 455/67 |
| 4,972,275 | 11/1990 | Spitz et al. ........................ | 360/55 |

*Primary Examiner*—Curtis Kuntz
*Assistant Examiner*—Chi H. Pham
*Attorney, Agent, or Firm*—Staas & Halsey

[57] ABSTRACT

An apparatus for a transmission-reception simulation test between a transmitter and a receiver located in the same station includes a testing device coupled to the transmitter and the receiver. The testing device includes, a first frequency converter for microwave frequency to microwave frequency conversion for producing a mixed signal of the output signal of a transmitter having a frequency $f_{rf1}$ and a second local oscillator signal having a frequency $f_{l2}$, a low-pass filter, and a second frequency converter for intermediate frequency to microwave frequency conversion for producing a mixed signal of the output signal of the low-pass filter and a first local oscillator signal having a frequency $f_{l1}$, the output signal of the second frequency converter having a frequency $f_{rf2}$ being supplied to a receiver.

13 Claims, 6 Drawing Sheets

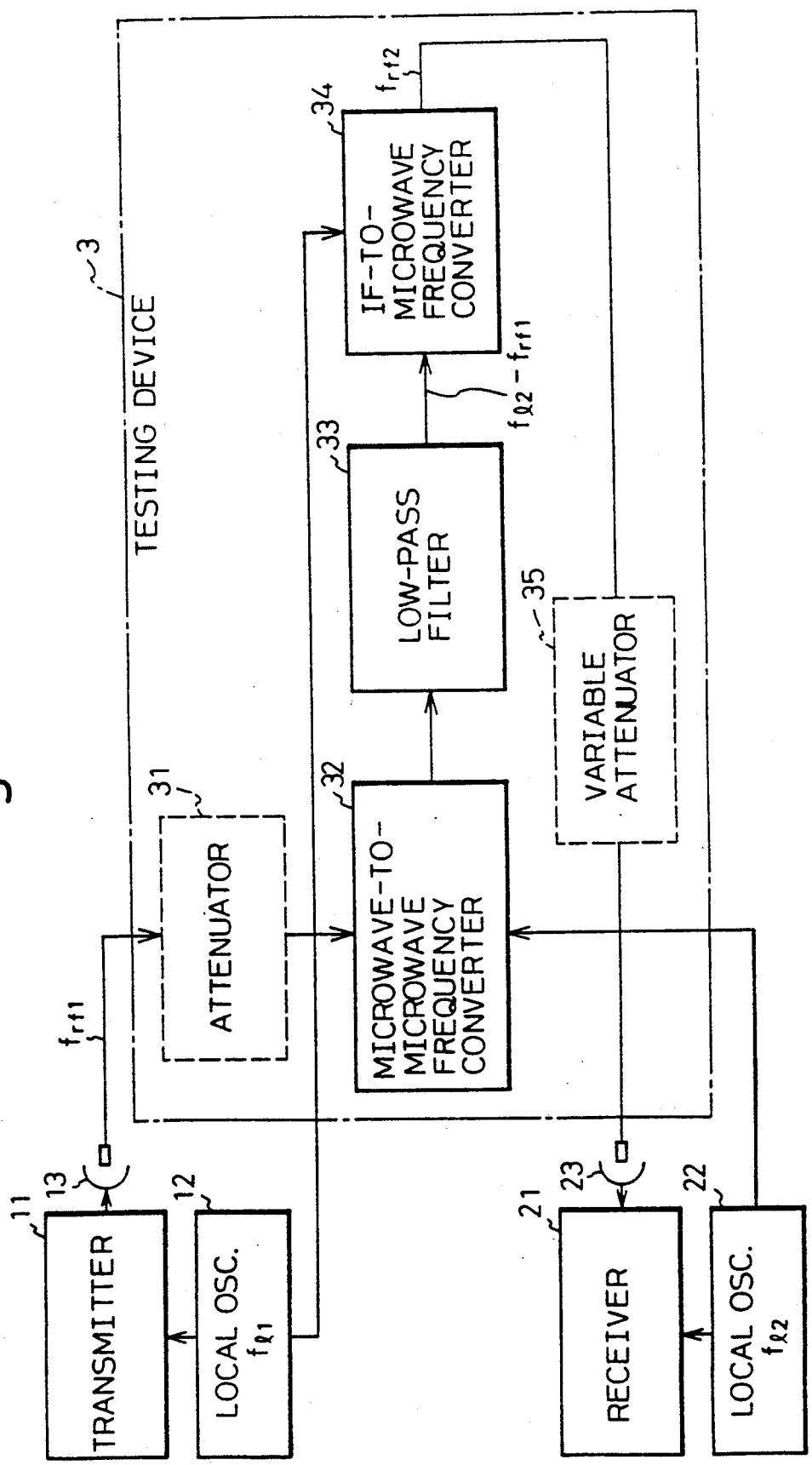

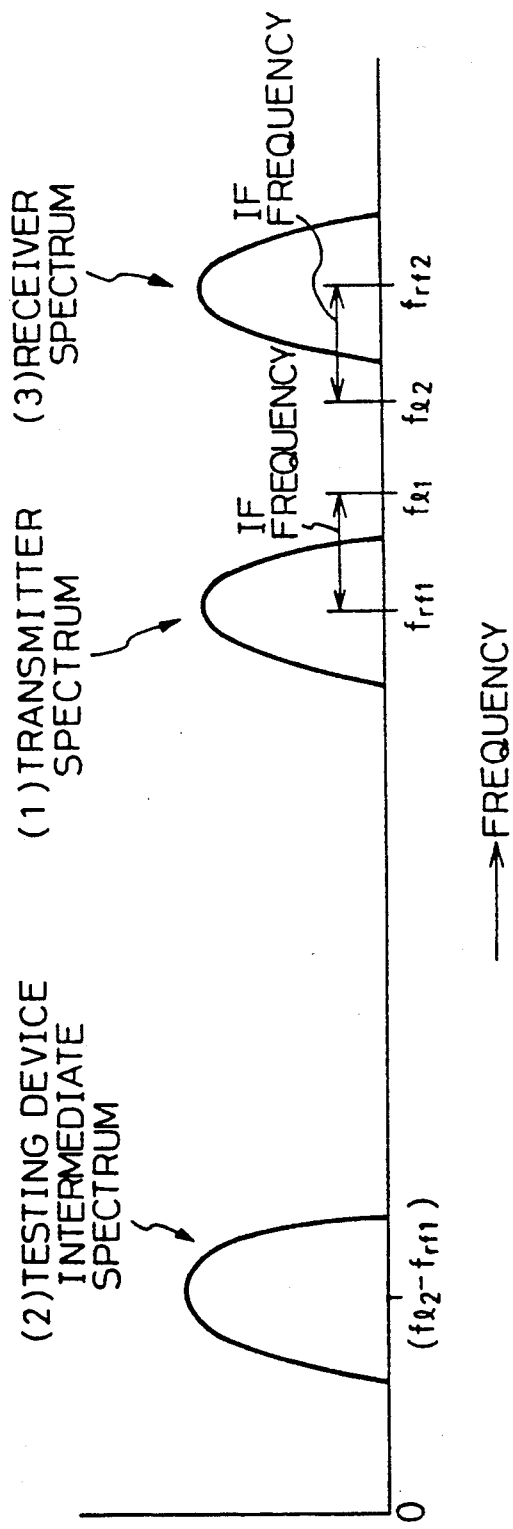

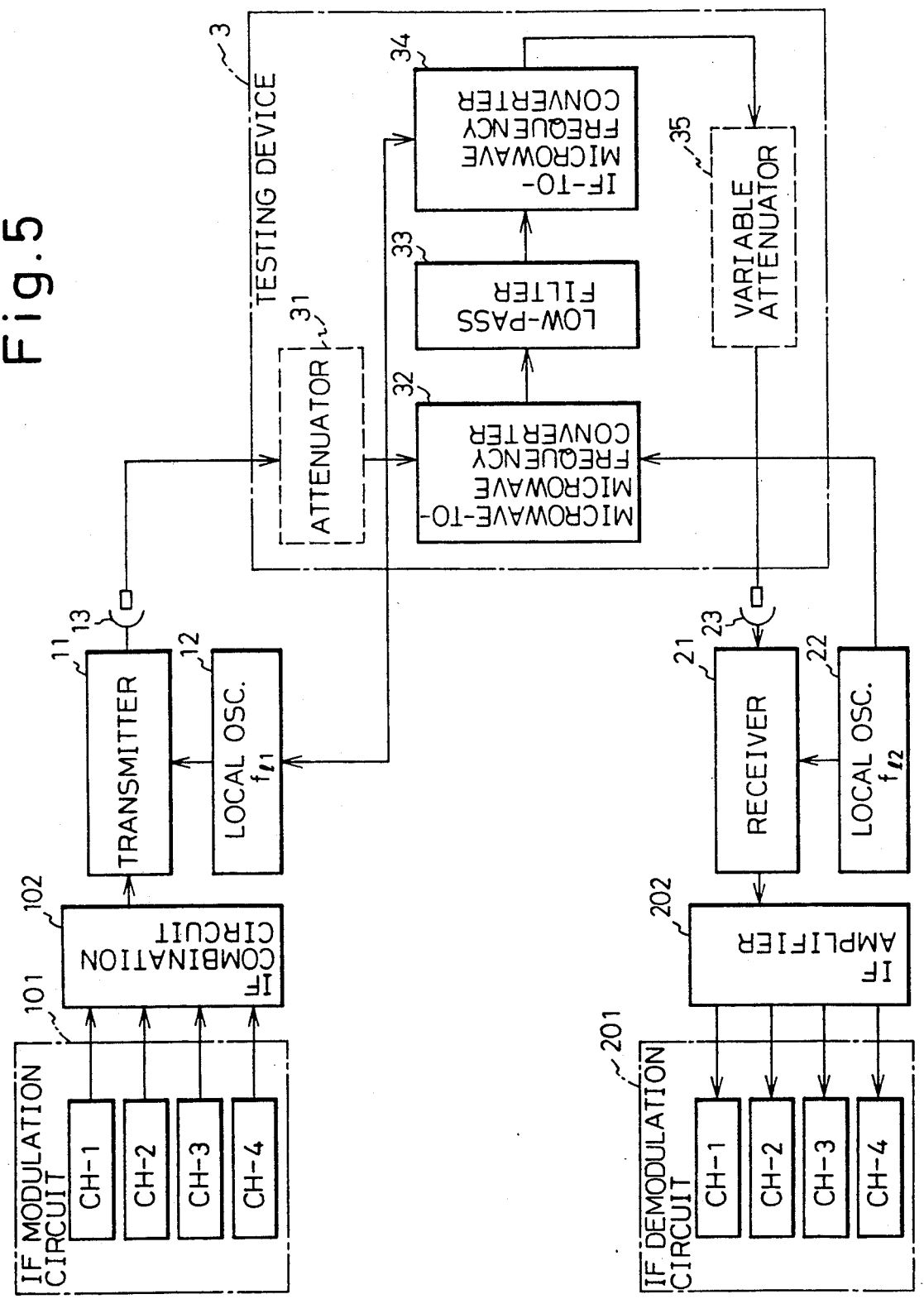

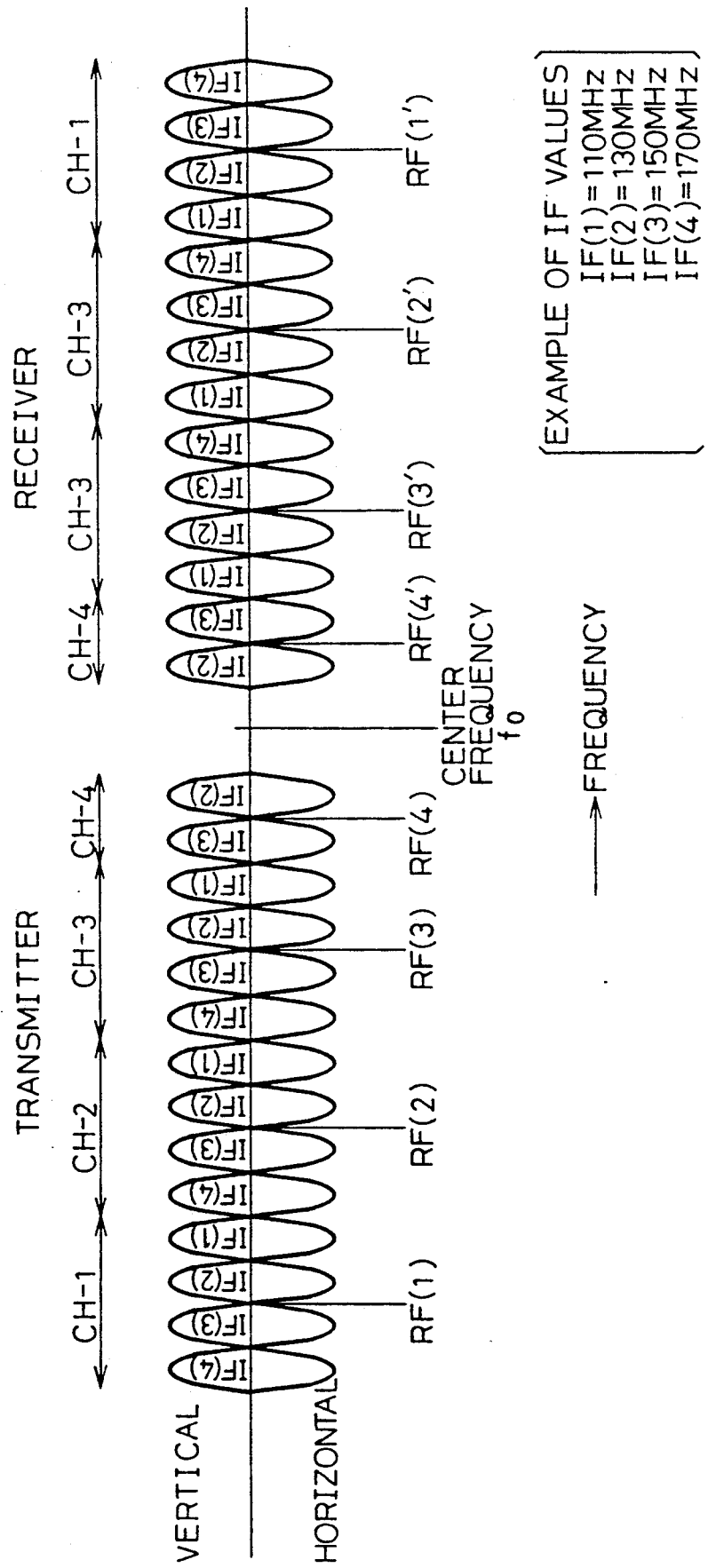

APPARATUS FOR TRANSMISSION-RECEPTION SIMULATION TEST FOR MICROWAVE COMMUNICATION

BACKGROUND OF THE INVENTION

1. Field of the Invention

The present invention relates to an apparatus for a transmission-reception simulation test for microwave communication. The apparatus according to the present invention can be used for testing the operational characteristics of a transmitter and a receiver in the same station in a simulation manner without transmitting or receiving microwaves to communicate with a remote opposite station. The transmitter and receiver may be for digital multiplex radio communication. The test of the operational characteristics may include the checking of the error rate in the transmission, the frequency characteristic, the power levels of signals in the system, and the like.

2. Description of Related Arts

In general, in the prior art apparatus for transmission-reception simulation test for a microwave radio communication system, it has been desired that the signal power level of the testing device local frequency signal, which is generated in a local oscillator in the testing device and supplied to a frequency converters in the testing device, is enhanced in order to extend the linear proportionality range between the input signal power and the output signal power of the frequency converters so that the back-off for the operation of the frequency converters is increased. However, when the signal power level of the testing device local frequency signal is enhanced, spurious signals are apt to be generated since the testing device local frequency signal contains high harmonic components, and this causes an unfavorable situation in the prior art apparatus.

SUMMARY OF THE INVENTION

It is an object of the present invention to provide an improved apparatus for a transmission-reception simulation test for microwave radio communication in which a sufficient ratio of the saturated power level of the output signal to the power level of the input signal (this ratio is called "back-off") is ensured to reduce the generation of undesirable signals so that the distortion of signals in the apparatus is reduced.

It is another object of the present invention to eliminate the test device local frequency oscillator in the apparatus so that the entire construction of the apparatus is simplified.

It is another object of the present invention to provide an improved apparatus for a transmission-reception simulation test for microwave radio communication which is applicable to the multi-carrier type microwave transmission system.

In accordance with the present invention, there is provided an apparatus for a transmission-reception simulation test between a transmitter and a receiver located in the same station including the transmitter operated by a signal having a first local oscillator frequency $f_{l1}$; the receiver operated by a signal having a second local oscillator frequency $f_{l2}$; and a testing device coupled to the transmitter and the receiver; the testing device includes a first frequency converter for microwave frequency to microwave frequency conversion for producing a mixed signal of the output signal of the transmitter having a frequency $f_{rf1}$ and the second local oscillator signal having a frequency $f_{l2}$; a low-pass filter; and a second frequency converter for intermediate frequency to microwave frequency conversion for producing a mixed signal of the output signal of the low-pass filter and the first local oscillator signal having frequency $f_{l1}$; the output signal having a frequency $f_{rf2}$ of the second frequency converter being supplied to the receiver.

BRIEF DESCRIPTION OF THE DRAWINGS

FIG. 3 is a schematic diagram of an apparatus for a transmission-reception, simulation test for microwave radio communication according to an embodiment of the present invention;

FIG. 4 illustrates the frequency arrangement of the operation of the apparatus of FIG. 3;

FIG. 5 shows an apparatus according to another embodiment of the present invention; and FIG. 6 illustrates the frequency arrangement of the operation of the apparatus of FIG. 5.

DESCRIPTION OF PREFERRED EMBODIMENTS

Figure 1:
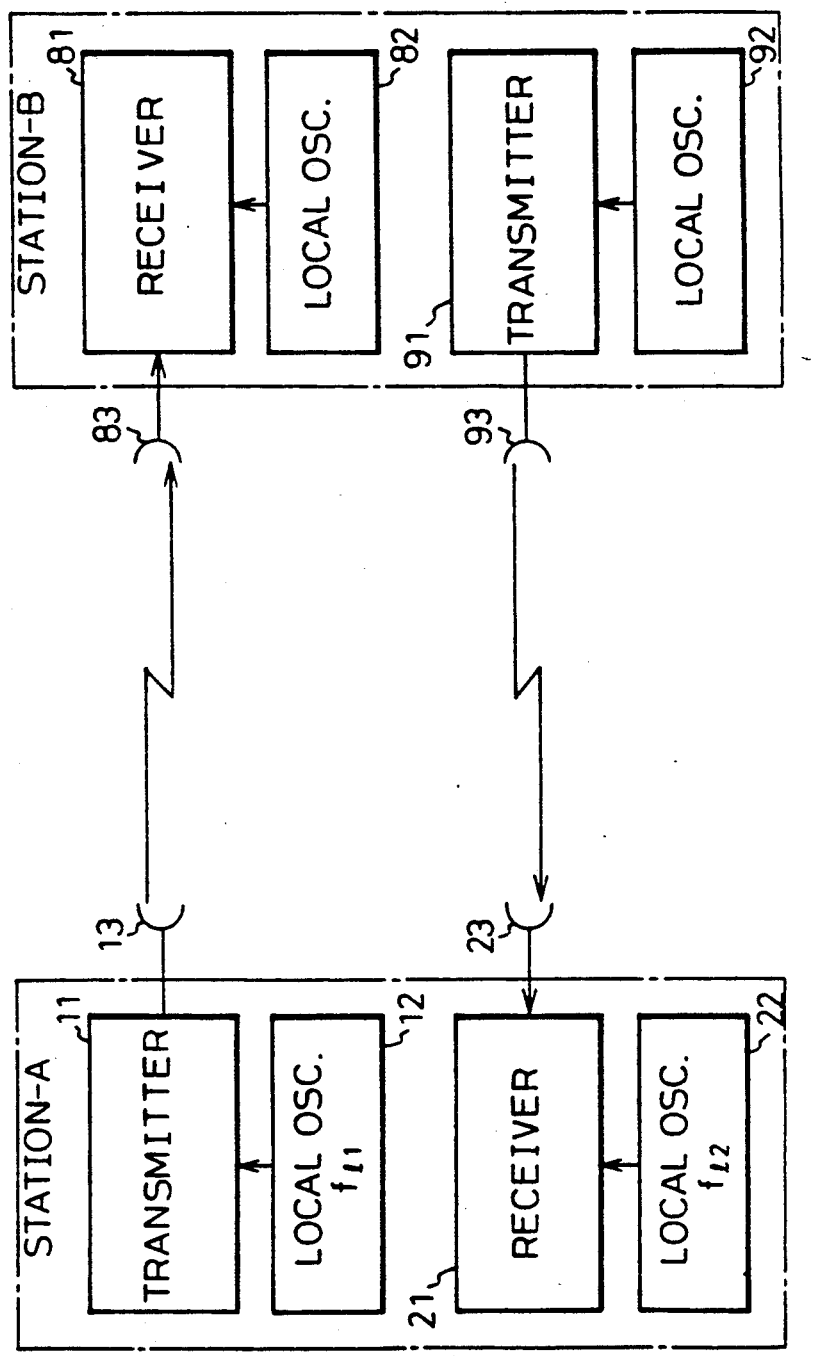
FIG. 1 illustrates a prior art microwave radio communication system.

Before describing the preferred embodiments, a prior art microwave radio communication system and a prior art apparatus for transmission-reception simulation test for such radio communication system are described with reference to FIGS. 1 and 2. The prior art microwave communication system for a digital multiplex communication is constituted by a local station-A having a transmitter 11 and a receiver 21 and a remote station-B having a receiver 81 and a transmitter 91. Electromagnetic radio waves are transmitted from the antenna 13 of the transmitter 11 to the antenna 83 of the receiver 81, and from the antenna 93 of the transmitter 91 to the antenna 23 of the receiver 21. A modulation of the type such as phase shift keying (PSK) or quadrature amplitude modulation (QAM) is used in this microwave communication system. The testing device 300 for the transmission-reception simulation test for the transmitter 11 and the receiver 21 is provided in the station-A as shown in FIG. 2.

The transmitter 11 is associated with the local oscillator 12 having a frequency $f_{l1}$, and the receiver 21 is associated with the local oscillator 21 having a frequency $f_{l2}$. The local frequencies $f_{l1}$ and $f_{l2}$ are, for example, of the order of 4 to 6 GHz.

The testing device 300 receives an input signal from the transmitter antenna 13 and supplies an output signal to the receiver antenna 23. In practice, usually, the input and output signals are transmitted from and to the transmitter and receiver antennas 13 and 23 through conductive connections (not shown) with the feeder circuits of the transmitter and receiver antennas 13 and 23. The testing device 300 includes an attenuator 301, a hybrid circuit 302, frequency converters 303 and 304, a local oscillator 305, an amplifier 306, hybrid circuits 307 and 308, and a variable attenuator 309. The frequency converters 303 and 304 constitute an image cancellation type frequency converter device. The frequency of the local oscillator 305 is selected to be a difference "$f_{rf1} - f_{rf2}$" which is the difference between frequency $f_{rf1}$ of the output signal from the transmitter 11 and the frequency $f_{rf2}$ of the signal received by the receiver 21. The frequency "$f_{rf1} - f_{rf2}$" is in the so called intermediate frequency (IF) range. The IF is, for example, of the order of 100 to 300 MHz. The frequency converters 303 and 304 are supplied with the signal corresponding to the output of the local oscillator 305 having a frequency "$f_{rf1} - f_{rf2}$" and convert the signal having the frequency $f_{rf1}$ into the signal having the frequency $f_{rf2}$. The frequencies $f_{rf1}$ and $f_{rf2}$ are in the so called microwave frequency range.

Figure 2:
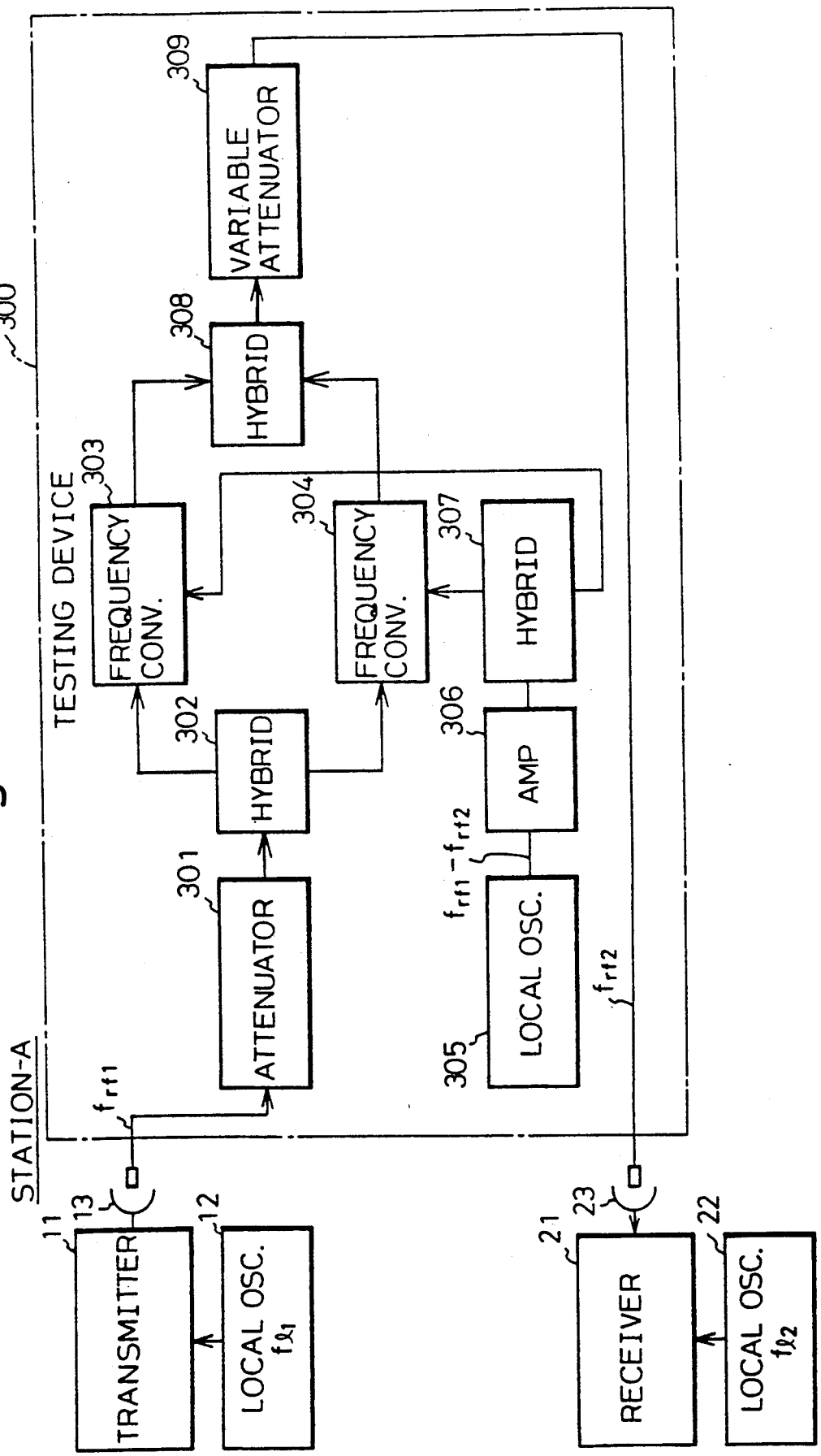
FIG. 2 illustrates a prior art apparatus for a transmission-reception simulation test for microwave radio communication.

In the device of FIG. 2, it is desired that the signal power level of the testing device local frequency "$f_{rf1} - f_{rf2}$" signal supplied to the frequency converters 303 and 304 is enhanced to extend the linear proportionality range between the input signal power and the output signal power of the frequency converters 303 and 304, so that the back-off for the operation of the frequency converters 303 and 304 is increased. However, when the signal power level of the testing device local frequency "$f_{rf1} - f_{rf2}$" signal is enhanced, spurious signals are apt to be generated since the testing device local frequency "$f_{rf1} - f_{rf2}$" signal contains high harmonic components. This causes an unfavorable situation in the prior art apparatus.

An apparatus for a transmission-reception simulation test for microwave radio communication according to an embodiment of the present invention is shown in FIG. 3. In a station there are provided a transmitter 11 associated with a local oscillator 12 having a frequency $f_{l1}$ and an antenna 13, a receiver 21 associated with a local oscillator 22 having a frequency $f_{l2}$ and an antenna 23, and a testing device 3. The testing device 3 includes an attenuator 31, a microwave-to-microwave frequency converter 32, a low-pass filter 33, an IF-to-microwave frequency converter 34, and a variable attenuator 35. The output of the local oscillator 12 having the frequency $f_{l1}$ is supplied to the IF-to-microwave frequency converter 34, and the output of the local oscillator 22 having the frequency $f_{l2}$ is supplied to the microwave-to-microwave frequency converter 32.

The microwave-to-microwave frequency converter 32 receives the signal corresponding to the output signal of the transmitter 11 having a frequency $f_{rf1}$ and the output signal of the local oscillator 22 having a frequency $f_{l2}$, carries out a frequency conversion to produce output signals including a signal having a frequency "$f_{l2} - f_{rf1}$" which is in an IF range, and supplies the produced output signal to the low-pass filter 33. The low-pass filter 33 selects the signal having the frequency "$f_{l2} - f_{rf1}$" and supplies the selected signal to the IF-to-microwave frequency converter 34.

The IF-to-microwave frequency converter 34 receives the selected signal having the frequency "$f_{l2} - f_{rf1}$" from the low-pass filter 33 and the output signal of the local oscillator 12 having the frequency $f_{l1}$, carries out a frequency conversion to produce an output signal having the following frequency.

$$f_{rf2} = (f_{l2} - f_{rf1}) + f_{l1}$$

Each of "$f_{l1} - f_{rf1}$" and "$f_{rf2} - f_{l2}$" is in an IF range. The frequency $f_{rf2}$ can be expressed as follows.

$$\begin{aligned} f_{rf2} &= f_{l1} + (f_{l2} - f_{rf1}) \\ &= f_{l2} + (f_{l1} - f_{rf1}) \end{aligned}$$

The output of the IF-to-microwave frequency converter 34 is supplied to the variable attenuator 35 the output of which is supplied to the receiver 21. Thus, the signal from the transmitter 11 having a microwave frequency $f_{rf1}$ is converted into a signal having the microwave frequency $f_{rf2}$, and the converted signal having the microwave frequency $f_{rf2}$ is supplied to the receiver 21.

The frequency arrangement of the operation of the apparatus of FIG. 3 can be illustrated as in FIG. 4. The spectrum (1) of the transmitter output having the center frequency $f_{rf1}$ is converted into the spectrum (2) of the testing device intermediate point by the microwave-to-microwave frequency converter 32. The spectrum (2) is then converted into the spectrum (3) of the receiver input having the center frequency $f_{rf2}$ by the IF-to-microwave frequency converter 34. In FIG. 4, $f_{rf1}$ and $F_{rf2}$ are microwave frequencies, and the difference "$f_{l1} - f_{rf1}$" and the difference "$f_{rf2} - f_{l2}$" are IF frequencies.

In the apparatus of FIG. 3, the signal power level of the local oscillator signals having frequencies $f_{l1}$ and $f_{l2}$ can be selected higher than the signal power level of the transmitter output signal having the frequency $f_{rf1}$, hence the saturation value of the output power level in the input/output power characteristic is increased, and accordingly the back-off in the operation of the frequency converter can be increased. Also, the signal having the frequency $f_{l2} - f_{rf1}$ only or the signal having the frequency $f_{rf2}$ is obtained by using only a single filter, and therefore the operation of the apparatus is not deteriorated by high harmonic signal components. Also, the local oscillator in the testing device for supplying a testing device local frequency signal as in the prior art apparatus is eliminated, and the change or replacement of the local oscillator in the testing device is not necessary so that the apparatus becomes more simplified. Also, the apparatus of FIG. 3 is applicable to the multi-carrier type microwave transmission system.

An apparatus for a transmission-reception simulation test for microwave radio communication of the multi-carrier type according to another embodiment of the present invention is shown in FIG. 5.

The apparatus of FIG. 5 includes an IF modulation circuit 101, an IF combination circuit 102, a transmitter 11 associated with a local oscillator 12 and an antenna 13, a testing device 3, a receiver 21 associated with a local oscillator 22 and an antenna 23, an IF amplifier 202, and an IF demodulation circuit 201.

The IF modulation circuit 101 produces a plurality of IF signals having a frequency difference therebetween in a sequence of channels CH-1 to CH-4. The IF combination circuit 102 combines the produced plurality of IF signals in the channels CH-1 to CH-4 and supplies the combined IF signal to the transmitter 11.

The IF amplifier 202 amplifies the output signal of the receiver 21 and supplies the amplified signal to the IF demodulation circuit 201. The IF demodulation circuit 201 produces a plurality of IF signals having a frequency difference therebetween in a sequence of channels CH-1 to CH-4.

The distribution of the frequencies in the channels of the apparatus of FIG. 5 is illustrated in FIG. 6. In FIG. 6, the channels CH-1 to CH-4 of the transmitter side are shown in the left side from the center frequency $f_0$, while the channels CH-1 to CH-4 of the receiver side are shown in the right side from the center frequency $f_0$. The channels CH-1, CH-2, CH-3, and CH-4 for the radio frequencies RF(1), RF(2) RF(3), and RF(4) are in the transmitter side. The channels CH-4, CH-3, CH-2, and CH-1 for the radio frequencies RF(4'), RF(3'), RF(2'), and RF(1') are in the receiver side. An example of IF values is IF(1)=110 MHz, IF(2)=130 MHz, IF(3)=150 MHz, and IF(4)=170 MHz.

In the apparatus of FIG. 5, the sequence of the spectrum for the channels in the receiver with regard to the transmitter is correctly arranged along the frequency axis in FIG. 6. The inappropriate arrangement of the sequence of the spectrum for the channels in the receiver with regard to the transmitter as in the prior art apparatus does not occur in the apparatus FIG. 5.

We claim:

1. An apparatus for use in performing a transmission-reception simulation test between a transmitter and a receiver located in the same station, comprising:
   the transmitter including means for producing an output signal having a first frequency and being operated by a signal having a first local oscillator frequency;
   the receiver including means for receiving a signal having a second frequency and being operated by a signal having a second local oscillator frequency; and
   a testing device operatively coupled to the transmitter and the receiver; said testing device comprising:
   first frequency converter means, operatively connected to the transmitter, for producing a first mixed signal based upon said output signal and upon said second local oscillator signal;
   second frequency converter means, operatively connected to said first frequency converter means, for producing a second mixed signal having said second frequency and being based upon at least a portion of said first mixed signal and upon said first local oscillator signal.

2. An apparatus according to claim 1, further comprising:
   an IF modulation circuit and an IF combination circuit operatively coupled to the transmitter; and
   an IF amplifier and an IF demodulation circuit operatively coupled to the receiver.

3. An apparatus as recited in claim 1, wherein the transmitter includes:
   means for modulating and combining plural signals; and the receiver includes:
   means for amplifying and demodulating a modulated and combined signal.

4. An apparatus as recited in claim 1, wherein each of said first frequency, said second frequency, said first local oscillator frequency, and said second local oscillator frequency is in a microwave frequency range.

5. An apparatus as recited in claim 4, wherein said first frequency converter means includes:
   a microwave frequency to microwave frequency converter; and said second frequency converter means includes:
   an intermediate frequency to microwave frequency converter.

6. An apparatus as recited in claim 1, wherein said first frequency converter means includes:
   a low-pass filter means for selecting said portion of said first mixed signal.

7. An apparatus as recited in claim 6, wherein said portion of said first mixed signal has a frequency equal to said second local oscillator frequency minus said first frequency.

8. An apparatus as recited in claim 7, wherein said second mixed signal has a frequency equal to said first local oscillator frequency plus said second local oscillator frequency minus said first frequency.

9. A testing device for use in performing a transmission-reception simulation test between a transmitter and a receiver, the transmitter transmitting an output signal having a first frequency based on a first oscillator signal having a first oscillator frequency, the receiver receiving a signal having a second frequency and responsive to a second oscillator signal having a second oscillator frequency, comprising:
   first frequency conversion means, operatively connected to the transmitter, for producing a first mixed signal based upon the output signal and upon one of the first oscillator signal and the second oscillator signal;
   second frequency conversion means, operatively connected to said first frequency conversion means, for producing a second mixed signal having a frequency equal to said second frequency and based upon at least a portion of said first mixed signal and upon the other one of the first oscillator signal and the second oscillator signal; and
   means for supplying said second mixed signal to the receiver.

10. A testing device as recited in claim 9, wherein said first frequency conversion means includes:
    a low-pass filter means for selecting said portion of said first mixed signal.

11. A testing device as recited in claim 9, wherein said first mixed signal includes an intermediate frequency, said intermediate frequency being a difference between the first frequency and one of the first oscillator frequency and the second oscillator frequency.

12. A testing device as recited in claim 11, wherein said second mixed signal has a frequency equal to the sum of said intermediate frequency and the other one of the first oscillator frequency and the second oscillator frequency.

13. A method for use in performing a transmission-reception simulation test between a transmitter and receiver, the transmitter transmitting an output signal having a first frequency and responsive to a first oscillator signal having a first oscillator frequency, the receiver receiving a signal having a second frequency and responsive to a second oscillator signal having a second oscillator frequency, comprising the steps of:
    producing a first mixed signal based upon the output signal and upon one of the first oscillator signal and the second oscillator signal;
    producing a second mixed signal having a frequency equal to said second frequency and based upon at least a portion of said first mixed signal and upon the other one of the first oscillator signal and the second oscillator signal; and
    supplying said second mixed signal to the receiver.

* * * * *